US008793926B2

(12) United States Patent
Hoggan

(10) Patent No.: US 8,793,926 B2
(45) Date of Patent: Aug. 5, 2014

(54) FOOT SNARE DEVICE

(75) Inventor: Michael James Hoggan, Valier, MT (US)

(73) Assignee: Universal Select-A-Catch, LLC, Valier, MT (US)

( * ) Notice: Subject to any disclaimer, the term of this patent is extended or adjusted under 35 U.S.C. 154(b) by 365 days.

(21) Appl. No.: 13/092,369

(22) Filed: Apr. 22, 2011

(65) Prior Publication Data

US 2012/0266518 A1    Oct. 25, 2012

(51) Int. Cl.
 *A01M 23/34*    (2006.01)
(52) U.S. Cl.
 USPC .................................................. 43/87; 43/85
(58) Field of Classification Search
 USPC ............................................... 43/85–87
 See application file for complete search history.

(56) References Cited

U.S. PATENT DOCUMENTS

| | | | | | |
|---|---|---|---|---|---|
| 1,402,753 | A | * | 1/1922 | Fairbanks | 43/87 |
| 1,671,414 | A | * | 5/1928 | Durand | 43/87 |
| 1,731,381 | A | * | 10/1929 | Kleffman | 43/87 |
| 1,738,907 | A | * | 12/1929 | Kleffman | 43/87 |
| 1,800,095 | A | * | 4/1931 | Nakagawa | 43/87 |
| 1,802,918 | A | * | 4/1931 | Kleffman | 43/87 |
| 1,860,378 | A | * | 5/1932 | Bailey | 43/87 |
| 1,913,893 | A | * | 6/1933 | Morrill | 43/87 |
| 2,020,598 | A | * | 11/1935 | Bailey | 43/87 |
| 2,110,333 | A | * | 3/1938 | Kleffman | 43/87 |
| 2,168,132 | A | | 8/1939 | Marshall | |
| 2,200,617 | A | * | 5/1940 | Clover | 43/87 |
| 2,275,737 | A | * | 3/1942 | Dacey | 43/96 |
| 2,458,176 | A | * | 1/1949 | Jones | 43/87 |
| 2,474,933 | A | * | 7/1949 | Dean | 43/87 |
| 2,592,390 | A | | 4/1952 | Burt | |
| 2,611,340 | A | * | 9/1952 | Manning | 43/58 |
| 2,683,952 | A | * | 7/1954 | Armstrong | 43/87 |
| 3,060,623 | A | * | 10/1962 | Aldrich | 43/87 |

(Continued)

FOREIGN PATENT DOCUMENTS

| FR | 2626739 A1 | * | 8/1989 | ............ A01M 23/34 |
|---|---|---|---|---|
| FR | 2758239 A1 | * | 7/1998 | ............ A01M 23/34 |

(Continued)

OTHER PUBLICATIONS

Patrick A. Darrow, Ramona T. Skirpstunas, S. Wade Carlson, and John A. Shivik, Comparison of Injuries to Coyote from 3 Types of Cable Foot-Restraints, The Journal of Wildlife Management, 2008, pp. 1441-1444, 73(8), The Wildlife Society, USA.

*Primary Examiner* — Darren W Ark
(74) *Attorney, Agent, or Firm* — William L. MacBride, Jr.

(57) ABSTRACT

The invention is an improved animal foot snare adapted to be used with a foot snare triggering device, comprising a snare cable with an anchoring device end and an opposite snare end and a chain with a loop slidably located on the snare cable proximal to the snare end. Said chain has a second locking end intermediately located along the cable, forming a noose with said cable. The locking end has a breakaway means in connection with a one-way locking means slidably attached to said cable which secures said chain to the snare cable for cinching the foot snare. Said device has a swiveled cable pulley slidably located along the snare cable between the locking end and the anchoring device end, where said pulley has a snare attachment means releasably installable to a foot snare triggering device, adapting the present invention to be used with foot snare triggering devices.

8 Claims, 3 Drawing Sheets

(56) References Cited

U.S. PATENT DOCUMENTS

| | | | |
|---|---|---|---|
| 4,083,142 A * | 4/1978 | Gregerson | 43/87 |
| 4,286,404 A * | 9/1981 | Novak et al. | 43/87 |
| 4,329,805 A * | 5/1982 | Novak | 43/87 |
| 4,578,894 A * | 4/1986 | Butera | 43/87 |
| 4,581,843 A * | 4/1986 | Fremont et al. | 43/87 |
| 4,581,844 A | 4/1986 | Torkko | |
| 4,739,578 A * | 4/1988 | Pitchford, Jr. | 43/87 |
| 4,751,790 A | 6/1988 | Thomas | |
| 4,761,911 A | 8/1988 | Butera | |
| 4,920,690 A * | 5/1990 | Olecko | 43/87 |
| 4,920,800 A | 5/1990 | Boura | |
| 5,675,928 A | 10/1997 | Tattrie | |
| 6,032,405 A * | 3/2000 | Rose | 43/87 |
| 8,079,174 B1 * | 12/2011 | Turman et al. | 43/87 |
| 2008/0083155 A1 * | 4/2008 | Waybright | 43/87 |
| 2011/0265368 A1 * | 11/2011 | DeMers | 43/87 |

FOREIGN PATENT DOCUMENTS

| | | | | |
|---|---|---|---|---|
| FR | 2770970 A1 * | 5/1999 | | A01M 23/34 |
| FR | 2856889 A1 * | 1/2005 | | A01M 23/34 |
| GB | 2271264 A * | 4/1994 | | A01M 23/34 |
| GB | 2300557 A * | 11/1996 | | A01M 23/34 |
| JP | 10179006 A * | 7/1998 | | A01M 23/34 |
| JP | 2001017059 A * | 1/2001 | | A01M 23/34 |
| JP | 2001120154 A * | 5/2001 | | A01M 23/34 |
| JP | 2005224111 A * | 8/2005 | | A01M 23/34 |
| JP | 2006055158 A * | 3/2006 | | A01M 23/34 |
| JP | 2012130299 A * | 7/2012 | | A01M 23/34 |

* cited by examiner

FOOT SNARE DEVICE

FIELD OF THE INVENTION

The present invention relates to a foot snare device, in particular to one used in combination with a foot snare triggering device, such as a spring triggered mechanism, for setting foot snare animal traps, modifying the conventional animal foot snare devices known in the industry.

BACKGROUND OF THE INVENTION

The capturing of animals for pelts and damage control is a long-practiced art. Through the years there have been attempts to make trapping devices more selective and humane. Several states and countries have now outlawed steel leg hold traps, and pressure continues to grow for more states to do the same. This humane selective foot snare device will be a valuable tool in capturing a wide variety of animals worldwide. Animal foot snare traps commonly operate via a triggering device to hold and then release a tensioned, trap-activating spring. This foot snare is a most humane, target specific leg-hold capturing device, easy to set with spring powered pan tension or other triggered mechanism devices, incorporated with snare stops, link chain and breakaway locks to keep non-target catches to a minimum. It can be constructed out of a wide variety of materials such as steel, aluminum, plastic, and rope-like material.

Every year hundreds of millions of dollars are lost to the livestock and agricultural industries due to animal predation and crop damage. A study conducted by the National Wildlife Research Center from May 2004-July 2006 (Journal of Wildlife Management, 73 (8)) compared foot injuries from different types of snares, with varying cables and breakaway means. Animals such as wolves, are captured, radio collared and released for the purpose of monitoring pack movement. The main capturing method that is available at this time is steel traps. An improvement is needed to inflict minimal foot damage, maintain foot blood circulation, in combination with the reduction of swelling, for a quicker animal recovery. Also, if non-target animals such as domestic dogs are captured, they may be released generally unharmed. Avoiding capture of larger animals, such as grizzlies, moose, elk and livestock, is a challenge when trapping for wolves. In many cases steel traps cannot be set at a kill site due to bears being present, making it difficult to capture the predating animals.

Feral hogs are another species causing millions of dollars in domestic and agricultural damage every year. The current capturing methods are either cage traps or neck snares. Feral hogs are educated quickly to cage traps and in many cases will refuse to enter. Neck snares are somewhat effective, but when set under fence lines, the fence in many cases sustains damage once the hog is captured. Neck snares also are not particularly target specific. Several states have outlawed steel traps and control tools are limited. Applications are needed for both animal damage control and private trapping endeavors in areas where currently applied control methods are restricted or limited.

Certain related art patent references disclose various types of ensnaring devices utilizing a snare cable and a one-way locking mechanism, for example a cam lock, such as: U.S. Pat. No. 6,032,405 to Rose ("'405 patent"), U.S. Pat. Nos. 4,578,894 and 4,761,911 to Butera ("'894 patent" and "'911 patent", respectively), U.S. Pat. No. 2,474,933 to Dean ("'933 patent"), U.S. Pat. No. 2,683,952 to Armstrong ("'952 patent"), U.S. Pat. No. 4,083,142 to Gregerson ("'142 patent"), U.S. Pat. No. 1,738,907 to Kleffman ("'907 patent") and U.S. Pat. No. 2,275,737 to Dacey ("'737 patent"). None of these cited references provide for the swiveling cable pulley and snare attachment means which are features of the present invention, allowing the present invention to engage with and disengage from a snare triggering mechanism. As well, none of these cited references provide the feature of a kinkless-chain and breakaway means, such as an S-hook to allow the escape of a non-targeted animal as in the present invention, except for a breakaway feature in the '405 patent. However, the '405 patent does not include a link chain, or require a trigger mechanism directly and permanently engaging the snare, and as such would not teach the inclusion of the feature of the present invention to allow the snare to disengage from a trigger mechanism upon capture of the targeted animal.

Some related art references utilize only the force of the trapped animal against the snare cable to tighten, or cinch, the snare noose whereas others incorporate a spring-loaded trigger mechanism to close and tighten the noose, such as the '405 patent, the U.S. Pat. No. 2,168,132 to Marshall ("'132 patent"), U.S. Pat. No. 2,592,390 to Burt ("'390 patent"), U.S. Pat. Nos. 4,329,805 and 4,286,404 to Novak ("'805 patent" and "'404 patent", respectively), U.S. Pat. No. 3,060,623 to Aldrich ("'623 patent"), U.S. Pat. No. 4,581,844 to Torkko ("'844 patent"), U.S. Pat. No. 4,751,790 to Thomas ("'790 patent"), U.S. Pat. No. 4,920,690 to Olecko ("'690 patent") and U.S. Pat. No. 5,675,928 to Tattrie ("'928 patent"). Again, none of these cited references provide for the swiveling cable pulley and snare attachment means features of the present invention, allowing the present invention to engage with and disengage from a triggering mechanism; and none of these newly cited references provide the feature of a kinkless link chain and breakaway means, such as an Shook to allow the escape of a non-targeted animal as in the present invention. As well, the '911 patent, '933 patent, '405 patent, '132 patent, '737 patent, '390 patent, '404 and '805 patents, '623 Aldrich, '844 Tarkko, '690 patent, and '928 patent do not have the feature of an anchoring device end of the present invention, to anchor or tether the released snare.

None of the cited devices herein have the feature of a deer stop to prevent the capture of a deer-like animal. Therefore, as noted, none of the references contain every feature of the present invention, and none of these reference in combination disclose or teach every feature of the present invention.

The foregoing and other objectives, advantages, aspects, and features of the present invention will be more fully understood and appreciated by those skilled in the art upon consideration of the detailed description of a preferred embodiment, presented below in conjunction with the accompanying drawings.

SUMMARY OF THE INVENTION

The invention is directed to an improved animal foot snare device adapted to be used in combination with a spring loaded trigger mechanism.

One embodiment of the present invention is a foot snare comprising a snare cable having an anchoring device end and an opposite snare end made of a number of different, bendable, wire- or rope-like materials, common in the industry. The anchoring device end in alternative embodiments is selected from a group consisting of a swiveled single stake anchor, a swiveled double stake anchor, and a swivel. One embodiment also comprises a link chain with a loop end slidably located on the snare cable proximal to the snare end where the link chain has a second locking end intermediately located along the snare cable. The link chain in one embodiment is a kink-less link chain. The link chain in cooperation with the snare cable forms a foot snare noose. The locking end has a breakaway means in operative connection with a one-way locking means slidably attached to the snare cable which directionally secures the link chain to the snare cable for cinching or tightening the foot snare.

In an embodiment of the present invention, said device has a swiveled cable pulley slidably located along the snare cable between the locking end and the anchoring device end, where the swiveled cable pulley has a snare attachment means releasably installable to a foot snare triggering device, adapting the present invention to be used in combination with foot snare triggering devices.

The foot snare is staked in the ground using the anchoring device end, the foot snare noose is laid over a foot snare triggering device in a manner as specified by the operation of such a specific device, and the foot snare is attached to said device via the snare attachment means, which is connected in the foot snare as part of the swiveled cable pulley. When a snare triggering device mechanism is sprung, the foot snare noose of the present invention is pulled or cinched, capturing the animal. The one-way locking means, such as a cam lock, slides down the snare cable while the kinkless link chain encircles the animal's leg. The animal is captured in the foot snare, anchored or tethered, and restrained by the anchoring device end.

In another embodiment the snare end has a double sleeved ferrule and an attached L-lock. The L-lock has a link leg attaching the L-lock to the snare end and an adjoining snare leg, intermediately and slidably located along the snare cable, to form the foot snare noose, for cinching the foot snare.

Links of kinkless chain are incorporated to go around the animal's lower leg; in tests this method has been shown to cause the least amount of foot damage, and when used in conjunction with a foot snare trigger mechanism, the snare lock capable of breaking away and opening the snare when larger non-target animals are captured, will also make the present invention an ideal animal capturing device.

One objective of the present invention is to provide a humane and selective foot snare that not only administers minimal injury to a captured animal, but also be as target specific as possible. In one embodiment of the present invention, the problem of leg damage is addressed by this device using a kinkless link chain to wrap around the captured animal's leg, causing little foot abrasion. The problem of developing a humane, selective and effective foot snare was further resolved in other embodiments by incorporating a snare cable with a short chain, breakaway S-hook, and a deer stop, with a one-way lock, and/or one of three anchoring device ends and a swiveled cable pulley equipped with snare attachment means, enabling the snare to work efficiently when used in conjunction with a snare triggering mechanism, such as the foot snare triggering mechanism device of Ser. No. 61/328, 982, U.S. Patent and Trademark Office.

Another objective of the present invention is solving the problem of a limited loop size found in a throw arm type foot snare system, using an embodiment of the present invention with the addition of the swiveled cable pulley, enabling the use of a larger snare loop diameter, and greatly increasing the foot snare closing speed, when used in conjunction with a foot snare triggering mechanism device.

Another objective of the present invention is addressing foot abrasions by using a short piece of kinkless chain in one embodiment, or other non-abrasive material encircling the animal's leg, minimizing such abrasions and retaining foot blood circulation to reduce swelling.

Another objective of the present invention, addressing capture of non-target animals, is resolved in an embodiment by the use of an S-hook breakaway device, which is designed to open, releasing the animal when sufficient pressure is applied. The problem of capturing non-target smaller animals is minimized with the kinkless chain addition in an embodiment of the present invention, prevents the snare from closing completely, avoiding the capture of smaller legged animals. The problem of capturing smaller legged hoofed animals, such as deer or antelope in the medium diameter foot snare is resolved in one embodiment by using a deer stop, preventing the snare from closing completely, leaving enough room for a smaller legged animal to extract its leg.

The aforementioned features, objectives, aspects and advantages of the present invention, and further objectives and advantages of the invention, will become apparent from a consideration of the drawings and ensuing description.

BRIEF DESCRIPTION OF THE SEVERAL VIEWS OF THE DRAWINGS

The foregoing features and other aspects of the present invention are explained and other features and objects of the present invention will become apparent in the following detailed descriptions, taken in conjunction with the accompanying drawings. However, the drawings are provided for purposes of illustration only, and are not intended as a definition of the limits of the invention.

ELEMENT REFERENCE NUMBERS TO THE DRAWINGS

The elements numbered in the foregoing drawings are summarized and listed below, and as such the elements listed are not intended as a definition of the limits of the invention.

| 100 | foot snare | 133 | swivel |
|---|---|---|---|
| 135 | swivelled cable pulley | 140 | snare attachment means |
| 105 | snare cable | 145 | double sleeved ferrule |
| 110 | locking end | 146 | single sleeved ferrule |
| 115 | breakaway means | 147 | eye bolt |
| 116 | one-way locking means | 150 | loop end |
| 117 | breakaway S-hook | 151 | washer |
| 118 | cam lock | 155 | deer stop |
| 120 | link chain | 156 | L-lock |
| 125 | snare end | 157 | snare leg |
| 130 | anchoring device end | 158 | link leg |
| 131 | swivelled double stake anchor | 160 | foot snare noose |
| 132 | swivelled single stake anchor | 161 | loop |

DETAILED DESCRIPTION OF THE INVENTION

The present invention will now be described more fully hereinafter with references to the accompanying drawings, in which the preferred embodiment of the invention is shown. This invention may, however, be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

Figure 1:
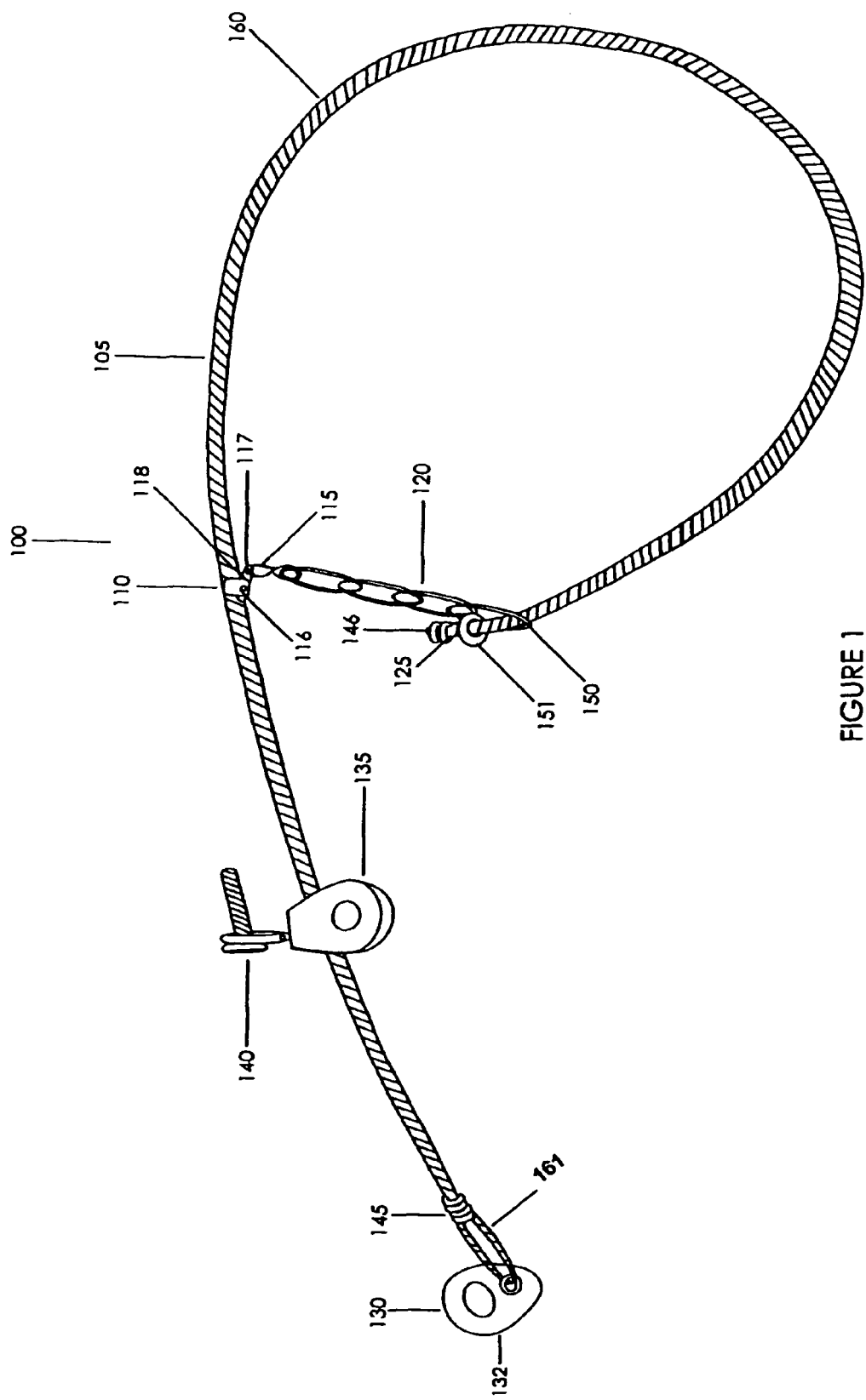
FIG. 1 illustrates a top plane view of one embodiment of the present invention, having a swiveled single stake anchoring means.
Figure 2:
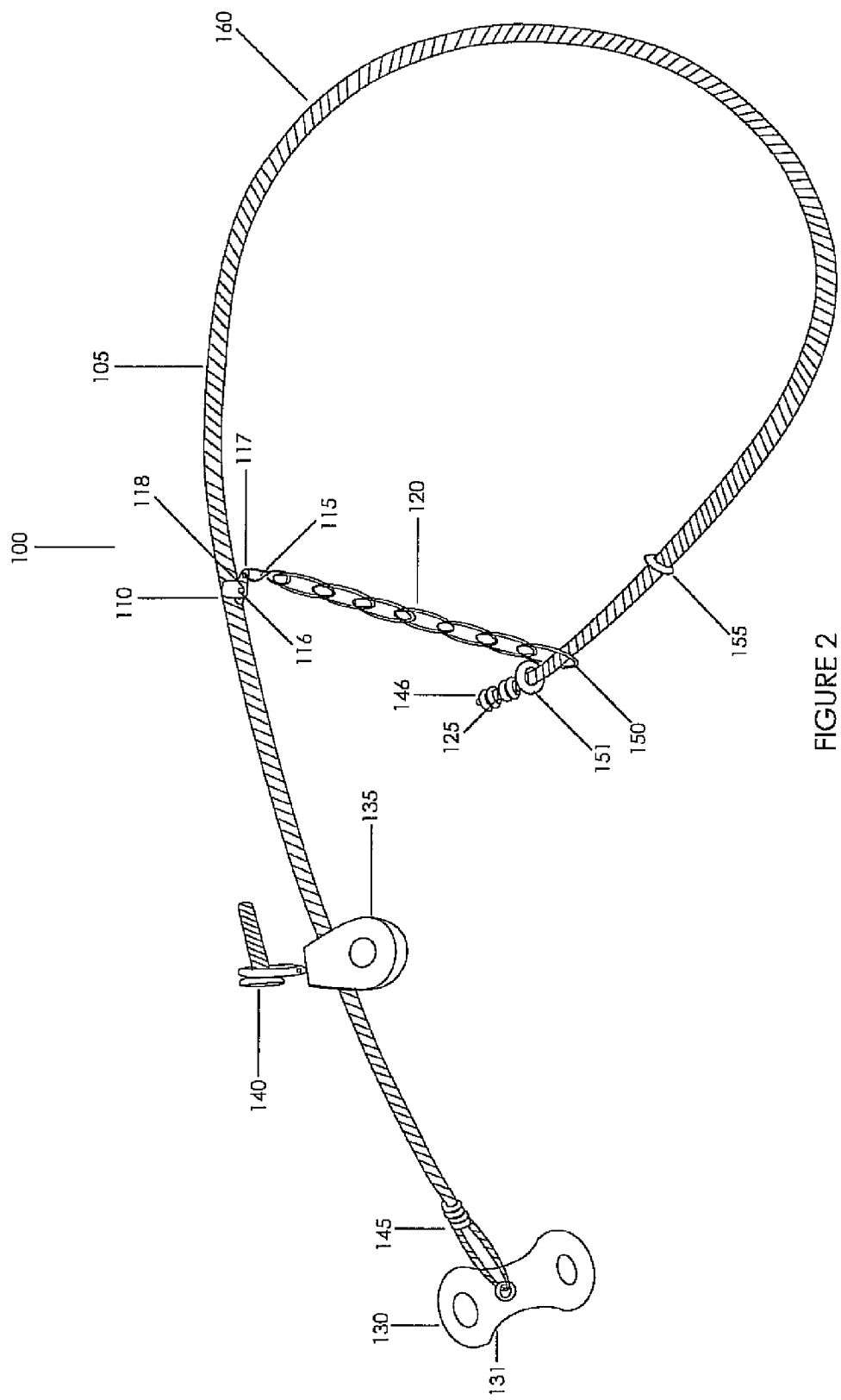
FIG. 2 illustrates a top plane view of one embodiment of the present invention, having a swiveled double stake anchoring means.
Figure 3:
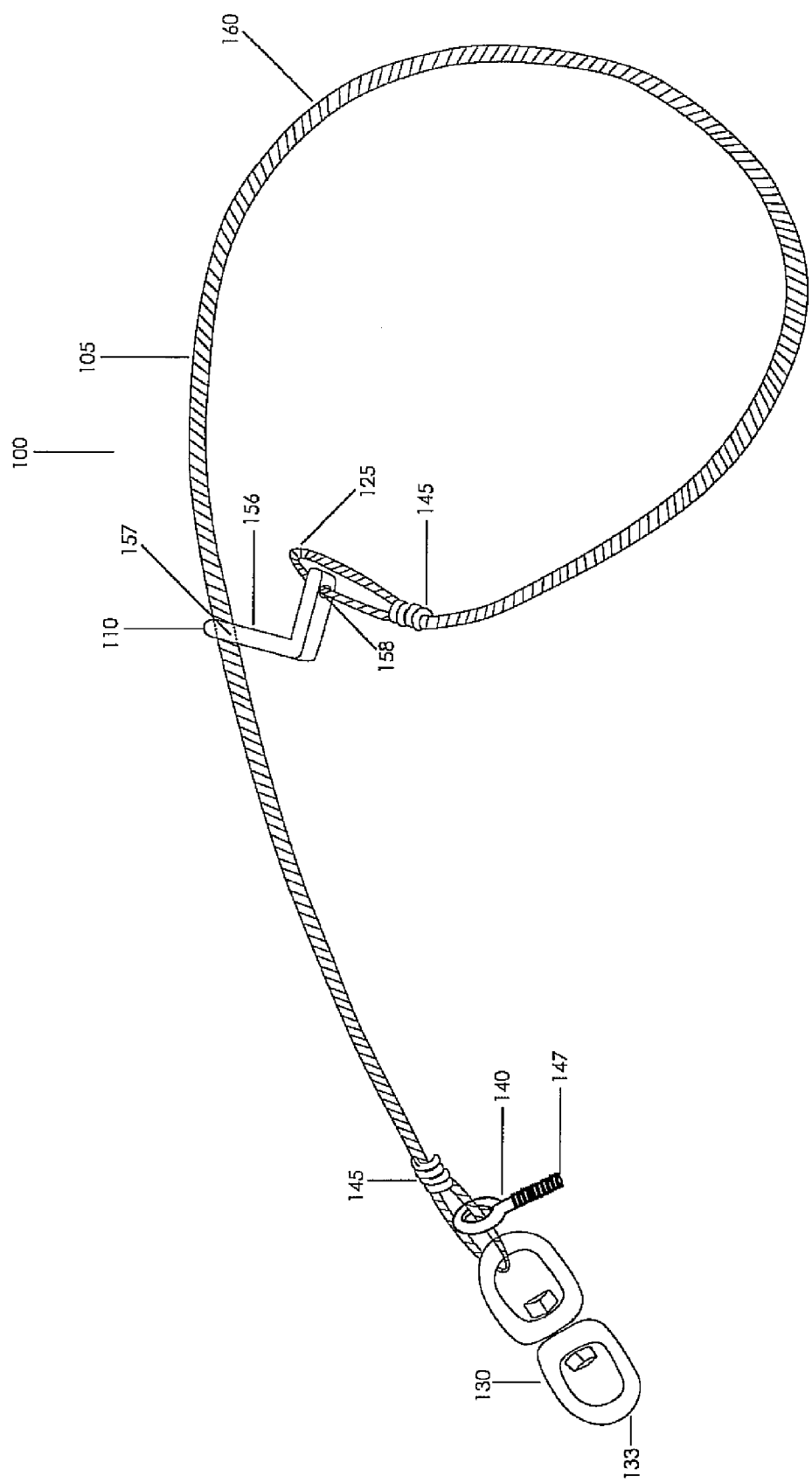
FIG. 3 illustrates a top plane view of one embodiment of the present invention, having a swivel anchoring means.

Turning now in detail to the drawings in accordance with the present invention, one embodiment of the present invention is depicted in FIG. 1, a foot snare device 100 comprising a snare cable 105 having an anchoring device end 130 and an opposite snare end 125. The snare cable 105 may be made of a number of different bendable, wire- or rope-like materials, such as bound metal wire, rope or nylon, common in the industry. The anchoring device end 130 in alternative embodiments, depicted in FIGS. 1, 2, and 3, is selected from a group consisting of a swiveled single stake anchor 132, a swiveled double stake anchor 131, and a swivel 133. The anchoring device end 130 comprises a loop 161. In one embodiment, the anchoring device end 130 further comprises a double sleeved ferrule 145, as shown in FIGS. 1, 2, and 3.

As shown in FIG. 1, one embodiment of the present invention also comprises a link chain 120 with a loop end 150 slidably located between the anchoring device end 130 and snare end 125 on the snare cable 105 proximal to the snare end 125 where the link chain 120 has a locking end 110 intermediately located between the anchoring device end 130 and snare end 125 along the snare cable 105. In one embodiment of the present invention, as shown in FIGS. 1 and 2, the loop end 150 is a washer 151. The anchoring device end 130, the double sleeved ferrule 145 and other elements of the embodiments of the present invention are made of durable materials, such as metal or plastic.

The link chain 120 in one embodiment is a kink-less link chain, made of resilient durable materials. The link chain 120 in cooperation with the snare cable 105 forms a foot snare noose 160. The locking end 110 has a breakaway means 115 for circumstantially releasing the foot snare noose 160 in operative connection with a one-way locking means 116 slidably attached to the snare cable 105 which directionally secures the link chain 120 to the snare cable 105, for cinching or tightening the foot snare noose 160. The breakaway means 115 allows a "circumstantive release" of the foot snare 100 when non-target animals are caught. As shown in FIGS. 1 and 2, the breakaway means 115 in the embodiment pictured is a breakaway S-hook 117, and the one-way locking means 116 is a cam lock 118. Other one-way locking means may be used in alternative embodiments.

There are alternative embodiments comprising breakaway means, such as S-hooks 117, shear pins or other such means, for small diameter foot snares 100 for releasing animals such as but not limited to deer and antelope, and for medium diameter foot snares 100 for releasing animals such as but not limited to cattle, elk, moose and larger grizzly bears. A swiveled cable pulley 135 with the snare attachment means 140 is provided in an alternative embodiment to enable the present invention to be used in conjunction with foot snare triggering mechanism devices.

As depicted in FIGS. 1, 2, and 3, in an embodiment of the present invention, said device 100 has the swiveled cable pulley 135 slidably located along the snare cable 105 between and independent of the locking end 110 and the loop 161 of the anchoring device end 130, where the swiveled cable pulley 135 has the snare attachment means 140 releasably installable to a foot snare triggering device, adapting the present invention to be used in combination with foot snare triggering devices known in the industry, particularly the foot snare triggering device of Ser. No. 61/328,982, U.S. Patent and Trademark Office. The snare attachment means 140 may be a releasable attaching means, such as a standard carriage bolt, eye bolt, or other bolt, clip, pin catch or other fastener, welded (or otherwise fixedly attached) to the swiveled cable pulley 135, being retractable or releasable from a port or other location of a snare triggering device on which it is installed, to temporarily secure the foot snare 100, when the foot snare 100 is triggered by a snare triggering device.

The swiveled cable pulley 135, attached to a coil spring firing unit or other such snare triggering mechanism quickly pulls and tightens, or cinches, the foot snare 100 when triggered. Upon capture of the animal, the snare attachment means 140 detaches from the snare triggering device releasing the foot snare 100 from the mechanism and decreasing the chance of damage to that mechanism. Unlike prior foot snares, the speed of the capture for the foot snare 100 of the present invention is increased with the swiveled cable pulley 135. FIG. 3 depicts a snare attachment means 140 as an eye bolt 147.

As depicted in FIG. 2, in an alternative embodiment the snare end 125 is a single sleeved ferrule 146. Also, as shown in FIG. 2, in another embodiment the present invention has a deer stop 155 located on the snare cable 105 proximal to the snare end 125 ulterior to the loop end 150.

As depicted in FIGS. 1, 2 and 3, in alternative embodiments of the present invention, the anchoring device end 130 may be a swiveled single stake anchor 132, a swiveled double stake anchor 131, or a swivel 133, to anchor the foot snare 100.

The device of the present invention in the embodiment shown in FIG. 1 is the foot snare 100 having a snare cable 105 that incorporates the use of a kinkless link chain 120, with a breakaway S-hook 117, cam lock 118 for a locking means 116, the anchoring device end 130 and the swiveled cable pulley 135. The foot snare device 100 can be used to capture a wide variety of animals, small or large, worldwide, incorporating triggering devices that minimize capturing and holding of non-target animals. The present invention is an alternative to steel traps and can be used by animal control personnel as well as the private sector. The device of the present invention will be a most useful tool in states which have banned steel traps.

The foot snare 100 is staked in the ground using the anchoring device end 130; the foot snare noose 160 is laid over a foot snare triggering device in a manner as specified by the operation of such a specific device; the foot snare 100 is attached to said device via the snare attachment means 140, which is connected in the foot snare 100 as part of the swiveled cable pulley 135. When a snare triggering device mechanism is sprung, the foot noose 160 is pulled or cinched, capturing the animal. The one-way locking means 116, such as a cam lock 118 slides down the snare cable 105 while the kinkless link chain 120 encircles the animal's leg. The cam lock 118 is limited to sliding one way as a one-way locking means 116, and once tightened, will not reverse, detaining the animal in as humane manner as is possible. The animal is captured in the foot snare 100, anchored or tethered, and restrained by the anchoring device end 130, independent of the triggering device.

In another embodiment of the present invention, depicted in FIG. 3, the snare end 125 has a double sleeved ferrule 145 and an attached L-lock 156. The L-lock has a link leg 158 attaching the L-lock 156 to the snare end 125 and an adjoining snare leg 157, intermediately and slidably located along the snare cable 105, to form the foot snare noose 160, for cinching the foot snare 100.

One embodiment of the present invention may be used for smaller footed animals, such as coyotes, fox, feral hogs, etc.

Links of kinkless link chain 120 are incorporated to go around the animal's lower leg; this method in tests has been shown to cause the least amount of foot damage. This, in conjunction with a one-way locking means 116 capable of breaking away and opening said foot snare 100 when larger non-target animals are captured, such as the breakaway S-hook 117, makes this an ideal small animal capturing device.

Another medium or large sized embodiment of the present invention may be used for larger animals, such as wolves, black bears, grizzly bears, moose, mountain lions, and other large animals, but may also be used on coyotes, feral hogs and other animals of like size. Wildlife managers as well as private trappers have a great need for this foot snare device of the present invention. One advantage of this present invention is the ability to use a larger foot snare noose 160, or loop, which increases chances of capture.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention device, therefore, should not be restricted, except in the following claims and their equivalents.

I claim:

1. A foot snare device, said device comprising:
    (a) a snare cable having an anchoring device end and an opposite snare end;
    (b) a link chain with a loop end slidably located on the snare cable proximal to the snare end;
    (c) the link chain having a locking end intermediately located between the anchoring device end and snare end along the snare cable, the link chain in cooperation with the snare cable thereby forming a foot snare noose;
    (d) the locking end having a breakaway means for circumstantively releasing the foot snare noose, in operative connection with a one-way locking means slidably attached to the snare cable and directionally securing the link chain to the snare cable for cinching the foot snare noose, the breakaway means comprising a breakaway s-hook;
    (e) the anchoring device end comprising a loop;
    (f) a swiveled cable pulley slidably located along the snare cable between and independent of the locking end and the loop of the anchoring device end;
    (g) the swiveled cable pulley having a snare attachment means releasably installable to a foot snare triggering device; and
    (h) whereby the foot snare device is adapted to be used in combination with the foot snare triggering device.

2. The device of claim 1, wherein the one-way locking means comprises a camlock.

3. The device of claim 1, wherein the anchoring device end comprises a swiveled single stake anchor.

4. The device of claim 3, wherein the anchoring device end further comprises a double sleeved ferrule which forms the loop, and the loop engages the swiveled single stake anchor of the anchoring device end.

5. The device of claim 1, wherein the link chain comprises a kink-less chain.

6. The device of claim 1, wherein the loop end comprises a washer.

7. The device of claim 1, wherein the snare end comprises a single sleeved ferrule.

8. The device of claim 1, further comprising a deer stop fixedly located on the snare cable proximal to the loop end of the link chain, ulterior to the snare end.

* * * * *